UNITED STATES PATENT OFFICE.

WILLIAM A. EDWARDS, OF CLINTON, MICHIGAN.

IMPROVEMENT IN THE MANUFACTURE OF PEARLASH.

Specification forming part of Letters Patent No. 6,117, dated February 13, 1849.

*To all whom it may concern:*

Be it known that I, WILLIAM A. EDWARDS, of the village of Mount Clemens, in the township of Clinton, in the county of Macomb, in the State of Michigan, have invented a new and Improved Mode of Making or Manufacturing Pearlash from Wood-Ashes; and I do hereby declare that the following is a full and exact description.

The nature of my invention consists in converting the ashes into pearlash without leaching and by only one boiling process of lye, instead of leaching the ashes and performing two boiling processes in the old common way. The mode I use is by burning or scorching the ashes in a pearling-oven, then boil them, then settle in settling-tubs, then dip liquor into kettles, and boil to white salts, and, lastly, pearl in the pearling-oven.

To enable others skilled in the art to make and use my invention, I will proceed to describe the mode and operation of it.

Take any given quantity of good house-ashes and burn or scorch them in the pearling-oven in a manner similar to the process of scorching of black salts by the old method; then boil from three to five minutes the scorched ashes, in the proportion of one and a half bushel to ninety gallons of water; put into settling-tubs and suffer to stand till the sediments fall, and you have a pure white liquor, which dip off carefully and boil to white salts, when they will be fit for and may be pearled in the pearling-oven, and the pearlash thus produced will be white, pure, and of a quality equally good with that produced by the old method, and will average at least five pounds to one bushel of ashes, whereas by the old way only five pounds of black salts are to be obtained from one bushel of ashes. By the process of my invention the leaching of the ashes and the boiling of the lye obtained therefrom are entirely saved, and the white salts obtained by the new and old way are equal in quality, and by the new way a ton of white salts can be produced in the same time and without any more labor than would be required by any former known way to produce one ton of black salts, saving in this part of the process all the time and expense of bringing the black salts to white salts. By the old method from four hundred to five hundred bushels of ashes are required to make a ton of black salts and twenty-five hundred pounds of black salts to make a ton of pearlash, whereas by my said improved mode four hundred bushels of ashes will produce a ton of pearlash.

What I claim as my invention is—

The process of first roasting or heating the ashes, once dissolving, and then pearling in the pearling-oven, thereby saving the expense of the leaching apparatus and one boiling operation, in the manner described in the specification.

WILLIAM A. EDWARDS.

Witnesses:
P. B. THURSTON,
P. A. THURSTON.